United States Patent [19]

Hunter

[11] 4,357,075
[45] Nov. 2, 1982

[54] CONFOCAL REFLECTOR SYSTEM

[76] Inventor: Thomas M. Hunter, 109 Lonsdale Rd., London S.W. 13, England

[21] Appl. No.: 163,155

[22] Filed: Jun. 26, 1980

[30] Foreign Application Priority Data

Jul. 2, 1979 [GB] United Kingdom ............... 7922929

[51] Int. Cl.³ .............................................. G02B 5/10
[52] U.S. Cl. .................................................. 350/294
[58] Field of Search ........................ 350/294; 362/298

[56] References Cited

U.S. PATENT DOCUMENTS

| 2,557,662 | 6/1951 | Kirkpatrick . | |
| 2,819,404 | 1/1958 | Herrnring et al. . | |
| 2,819,649 | 1/1958 | McLeod et al. | 350/294 X |
| 2,944,156 | 7/1960 | Davy et al. | 350/294 X |
| 3,224,330 | 12/1965 | Kompfner . | |
| 4,017,163 | 4/1977 | Glass . | |
| 4,161,351 | 7/1979 | Thomas et al. . | |
| 4,239,342 | 12/1980 | Aurin et al. | 350/294 |

FOREIGN PATENT DOCUMENTS

| 1037720 | 8/1958 | Fed. Rep. of Germany . |
| 1518806 | 2/1968 | France . |
| 1412954 | 11/1975 | United Kingdom . |
| 1417155 | 12/1975 | United Kingdom . |

OTHER PUBLICATIONS

Kaehler et al., "Arc-Image Welding", Welding Research Supplement, U.S. Air Force; 1965, pp. 497–S-503s.
Nikifarov, et al., Svar. Proiz, No. 9, 1969, pp. 1-3.

Primary Examiner—F. L. Evans
Attorney, Agent, or Firm—Stevens, Davis, Miller & Mosher

[57] ABSTRACT

A reflective focussing system comprises two concave reflectors. Each reflector is a surface of revolution generated by rotating selected quadratic conic sections about an axis. The first reflector has its first focus on the axis and the second reflector has its first focus on, or at least centered on, the axis, and located on the side of the second reflector remote from the first reflector. The second foci of the reflectors are commonly located. Alternative arrangements are disclosed in which the second foci of the two reflectors are not commonly located, but further means is provided to project radiation from the first reflector to the second focus of the second reflector; in which one or both of said foci are rings centered on the axis rather than points; in which adjacent pairs of reflectors are divided into portions, corresponding portions of the pair being confocal, but different portions sharing different common foci; and in which radiation projected from said two reflectors crosses the axis nil, one or a plurality of times.

13 Claims, 13 Drawing Figures

CONFOCAL REFLECTOR SYSTEM

This invention relates to reflective focussing systems using confocal reflectors, i.e. reflectors generated by rotating selected quadratic conic sections about an axis, succeeding pairs of such reflectors having a common focus.

In order to capture the maximum amount of radiation emanating from a source and focus it at a final image, the reflector or reflectors should enclose a maximum solid angle at the source and the image. This has the disadvantage that access to the source and image is restricted, and may only be possible by removing or pivoting back a reflector portion. If some loss of radiation is allowed, then part of the reflector around the image can be cut away to allow access to the image, for example to allow a detector or sample to be placed at the image position.

A summary of the then known systems was given in a paper presented to the American Welding Society 46th Annual Meeting 1965 in a paper by W. A. Kaehler and others and published in the Welding Research Supplement of the United States Airforce page 497-s. Paraboloidal and ellipsoidal systems are disclosed in which the source and image are enclosed by the mirrors, and a paraboloidal system is disclosed in which the source and image are located outside the mirrors. Two symmetrical paraboloid mirrors are used facing each other. Radiation from the source at the focus of the first mirror passes through a central aperture in the second mirror to be collected by the first mirror from which it is reflected back to the second mirror along rays parallel to the axis to be focussed by the second mirror through a central aperture in the first mirror.

A paper entitled "Using Focussed Beams from Powerful Xenon Lamps for Welding and Brazing Metals" by G. D. Nikiforov and others published in SVAR. PRIOZ. 1969, No. 9, pages 1 to 3 discloses a reflector and lens system and implies a possible peak image intensity of 8000 W/cm$^2$. British Pat. No. 1,417,155 relates to an arrangement in which a peak image intensity of 2000 W/cm$^2$ using only a reflector is mentioned.

According to the invention there is provided a reflective focussing system for projecting an image of an object located at an object position on the axis of symmetry of the system to an image position along said axis, said system being characterised by two confocal concave reflectors of which the first reflector means is arranged with a first focus at said object position and the second reflector means is arranged with a first focus centred on said axis, the second foci of said reflector means being at least substantially common or further means being provided to project radiation focussed at the second focus of the first reflector means to a focus at the second focus of the second reflector means, the first focus of the second reflector means being located on the side of the second reflector means remote from the first reflector means.

The further means may also be reflector means. The quadratic curve generating each reflector means is preferably an ellipse, but one or more of the reflector means in the system may be hyperboloid or paraboloid. The generating curve may be rotated about an axis not coincident with the line joining the foci of the curve, so that at least one focus of the reflector means is a ring focus. This axis may pass through the first focus of the curve but not through the second focus so that the second focus of the reflector means is a ring of radius X where X is the distance of the second focus of the curve from the axis.

The reflector means may be formed in a plurality of portions of a quadratic curve of revolution, the curve of revolution being divided along parallel planes parallel to the axis to form the portions. Each portion is displaced by pivoting about an axis through the first focus transverse to the axis. With such an arrangement the second foci of the portions are arranged in an arc which crosses the axis at right angles to both the axes mentioned above. This arrangement is useful when it is desired to heat an elongated area. An object to be heated, such as a printed circuit, may be traversed through the elongated area so that the whole of the body receives heat uniformly.

Two adjacent reflector means may each comprise surfaces of revolution generated by rotating curves formed from a plurality of quadratic curve portions, corresponding portions of the adjacent reflector means having a common focus, the focus being different for the different portions, but the portions in this case have boundaries transverse to the direction of the line joining the foci. The plurality of portions may be formed as one integral reflector. Preferably, the curves forming adjacent portions merge smoothly one into the other so that radiation reflected from the boundary between adjacent curves passes through the foci corresponding to both said portions.

The magnification of an object by a quadratic curve-generated reflector varies according to the point on the reflector from which the light is reflected. Approximately, the magnification is the ratio of the image and object distances from the reflection point. If the magnification range of a reflector has to be limited, it is necessary to limit the angle subtended by that reflector at the incident pencil of rays with consequent loss of total radiation reflected.

The use of different foci for different portions of a reflector enables the magnification of the reflector to be made more uniform for radiation falling on the different portions of the reflector by changing the shape of the curve generating the different portions.

A pencil of rays incident upon and reflected from one portion of one reflector means preferably encloses a volume within which a second portion of said reflector means is located; alternatively, at least some adjacent reflectors of said plurality may be contiguous.

A convergent lens may be provided between the second reflector means and the first focus of the second reflector means to converge radiation projected towards said first focus to said image position.

It has been suggested that, when both foci of the second reflector means are enclosed within the second reflector means, the final image position be brought beyond the second reflector by making the final image position remote from either focus of the second reflector, by deflecting by means of a convex reflector radiation directed towards that focus through an aperture in the second reflector to a final image position beyond the second reflector. This, however, leads to an image of high magnification and therefore low intensity. The present invention uses concave reflectors.

The overall magnification of a system of reflectors is approximately equal to the product of the magnifications produced by the individual reflectors, i.e. proportional to the product of the distance ratios discussed above. The use of multiple reflectors enables a more uniform magnification at the final image to be obtained by arranging that a pencil of rays highly magnified at one reflector undergoes a negative magnification at the second reflector, and vice versa. It is preferable to limit the magnification at the final image relative to the object to a predetermined maximum magnification value, preferably not exceeding 2.0 and ideally not exceeding 1.5. The smaller the magnification the higher the intensity of the image, but the volume over which the high intensity extends will be smaller. This limitation can be done by using multi-portion reflectors as already discussed, for example, and any extreme magnification values obtained from reflection from an area of a reflector can be avoided by cutting the reflector away over that area and possibly replacing it with a differently shaped portion co-operating with a corresponding portion on the other reflector to produce a magnification in the desired range.

A reflector, preferably the second reflector, may be formed as a solid body having an internally reflecting outer surface, for example formed by coating the solid body.

In order to use backwards-directed radiation as well as forwards directed radiation, a back reflector may be provided on the opposite side of the source from the first reflector to return radiation back to the source and on to the first reflector. In this way extra radiation is collected without increasing the size of the first reflector.

When the first focus of the second reflector means is not a point, for example if it is a ring or points on an arc as suggested above, the illuminated area in the focal plane is extended, for example, to irradiate a bigger sample, and the illumination is made more uniform since the individual peaks are distributed.

SHORT DESCRIPTION OF DRAWINGS

Examples of the invention and of a conventional system will now be described with reference to the accompanying drawings, in which.

DESCRIPTION OF THE EXAMPLES

Figure 1:
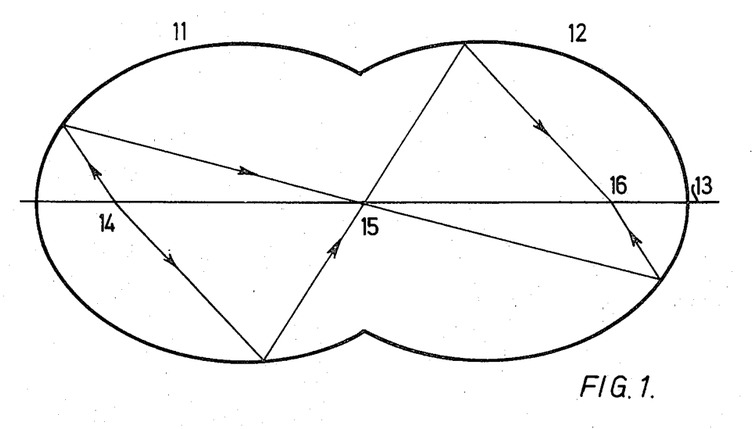
FIG. 1 represents a conventional reflective focussing system using two ellipsoidal mirrors.

FIG. 1 shows a conventional reflector focussing system comprising two opposed ellipsoidal mirrors 11 and 12, a common axis of revolution 13, a source 14 being mounted at the first focus of the first mirror 11 which forms an image at its second focus 15 at which the second focus of the second mirror 12 is also located so that the second mirror 12 focusses light from the point 15 to an image point 16. This symmetrical system produces an image at the point 16 of about the same size as the source 14, and the only loss of intensity at the image point 16 is caused by the absence from the complete ellipsoids of the mirrors 11 and 12 where they meet in the tangential plane at the common focus 15. This arrangement thus produces a high intensity image, but it has the disadvantage that the image point 16 is enclosed within the second mirror 12, so that detectors or samples cannot be brought into the image position 16 without moving a mirror.

Most electric arcs do not radiate uniformly in all directions. It is usual to align the electrodes with the optical axis of the system, and the electrodes obscure radiation along and near the axis. Carbon arcs direct most of their radiation over a solid angle extending about 70° on either side of the axis and Xenon arcs direct their radiation over a limited solid angle extending on either side of the normal to the axis. The limited radiation angles make unnecessary the arrangement of FIG. 1 in which the sources are totally enclosed.

A typical Xenon bulb radiates the following percentages of its total radiation within the solid angle ranges listed below, the angles being measured from the forward direction of the axis (to the right in the Figures), which is the cathode end of the bulb in the arrangement used in all embodiments of the invention to be described herein. This is the reverse of the conventional Xenon bulb arrangement.

| Angle Range | Percentage of Radiation Emitted |
| --- | --- |
| 0–30° | small amount |
| 30–40° | 6.0 |
| 40–50° | 7.5 |
| 50–60° | 8.7 |
| 60–70° | 9.6 |
| 70–80° | 10.1 |
| 80–90° | 10.2 |
| 90–100° | 10.2 |
| 100–110° | 9.9 |
| 110–120° | 9.3 |
| 120–130° | 8.3 |
| 130–140° | 5.6 |
| 140–150° | small amount |

The values in the above table are not symmetrical, since the source itself is not symmetrical having an anode at one end and a cathode at the other. It will be seen that about 50% of the total emitted radiation is emitted within about 25° on either side of the normal to the optical axis.

Figure 2:
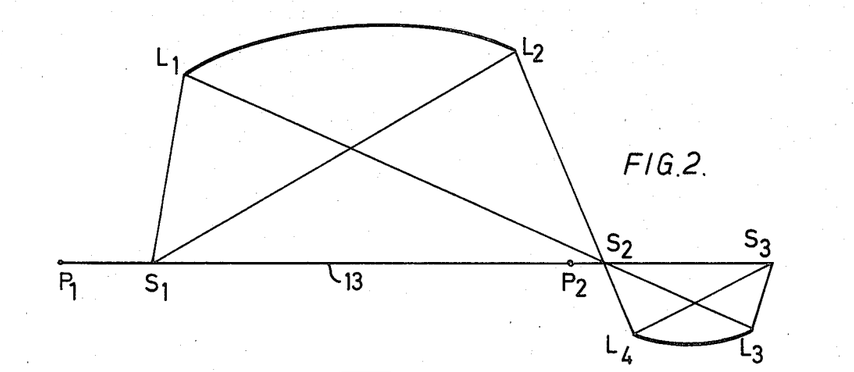
FIGS. 2 to 9 each illustrates a reflective system or systems each of which is a separate embodiment of the present invention.

FIG. 2 shows a modification of the two-mirror arrangement of FIG. 1, in which the mirrors are restricted to subtend only certain angles at the source and final image. Along the optical axis 13, P1 represents the pole of the first elliptical mirror, S1 its first focus and S2 its second focus. P2 represents the pole of the second mirror, S3 its first focus, its second focus being common with that of the first mirror at point S2. The mirror 11 is represented by the elliptical curve L1, L2, and the mirror itself follows the surface of revolution caused by rotating the curve L1, L2 through 360° about the axis 13. Similarly, the second mirror is formed by rotating the elliptical curve L3, L4 through 360° about the axis 13.

It will be seen that the first mirror subtends angles between about 100° and 140° relative to the axis 13 at the source S1. Although this range of angles does not include the angles over which radiation is a maximum, this size and arrangement of the first mirror has been found to be preferable since, in conjunction with the size and arrangement of the second mirror, it exhibits a combined magnification of about 1.1 or a little over, so that the radiation from the source is not spread over too large an area in the focal plane and hence the intensity of illumination at the focal plane is kept at a high level, so that a high temperature can be generated in an object placed in the focal plane.

It has been proposed, for example in the references mentioned above and also in Bulletin RFU 585 dated May, 1965 by Arthur D. Little Inc. of Cambridge Mass., United States of America, relating to their ADL Model 24 Arc Imaging Crystal Growing Furnace that pairs of facing parabolic mirrors can be used for reflecting light from a source such as a Xenon lamp to a sample, but such mirrors have a large diameter measured from the axis of revolution. The first mirror of FIG. 2 has a maximum diameter not greater than one half the bulb length, and the second reflector has a maximum diameter limited to one third of the maximum diameter of the first mirror. The bulb length will vary with the power input of the bulb, and typical relationships between power input and bulb length are:

| Rated Power Input (Watts) | Total Length (mm) |
| --- | --- |
| 75 | 90 |
| 1,000 | 235 |
| 2,000 | 370 |
| 4,000 | 428 |
| 6,500 | 483 |

Figure 3:
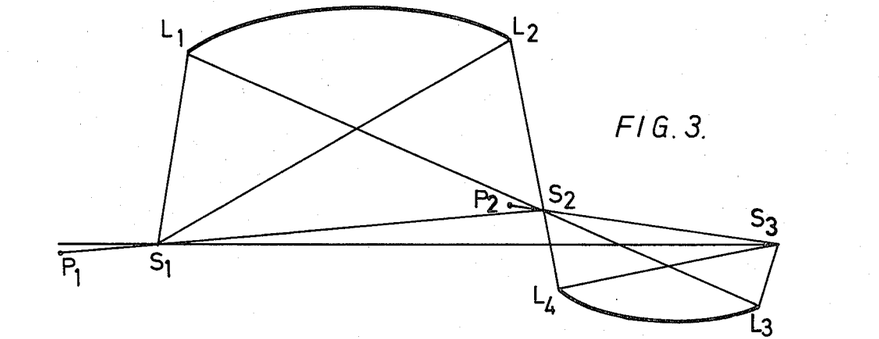

FIG. 3 shows a modification of FIG. 2 in which S2 remains the common focus of the two elliptical curves L1, L2 and L3, L4 and the mirrors are generated by rotating the curves L1, L2 and L3, L4 about the optical axis 13, but in this case S2 is displaced from the axis 13. The common focus of the mirrors is therefore a ring centered on the axis 13, rather than a point on the axis 13. This arrangement enables the total magnification to be reduced from a overall figure of about 1.1 in FIG. 2 to about 0.9 in FIG. 3, so that the radiation from the source is concentrated over a small area in the focal plane at S3. I have calculated that the rays reflected at point L1 in FIG. 2 produce a magnification of 1.03 at the final focal plane and those at L2 a magnification of 1.12. It will also be seen that the curve L3, L4 is longer in FIG. 3 that it was in FIG. 2, and so the second reflector collects more radiation in this embodiment.

Figure 4:
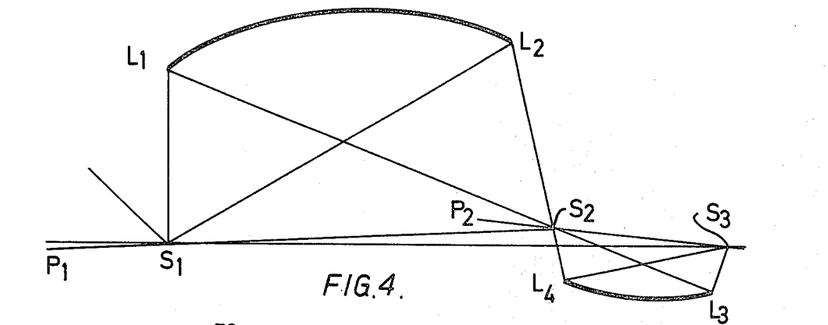

FIG. 4 shows a modified arrangement of FIG. 3 in which L1 has been extended further to the rear in order to collect direct radiation at between 30° and 90° to the axis, which radiation forms about 52% of the whole (see the Table above).

Figure 5A:
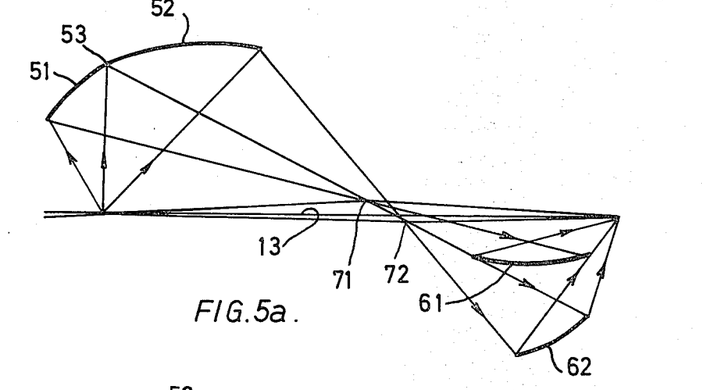
Figure 5B:
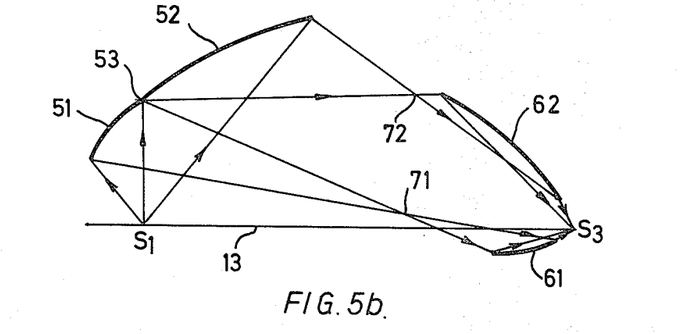
Figure 6A:
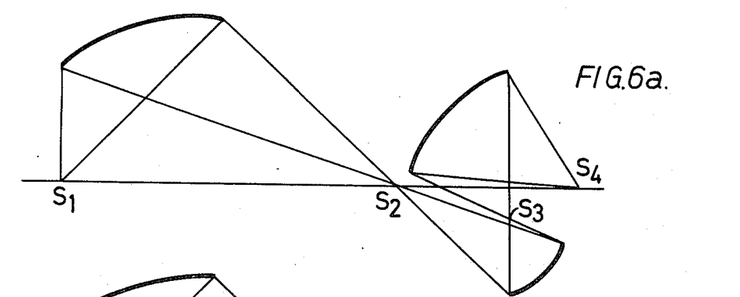
Figures 6B, 6C:
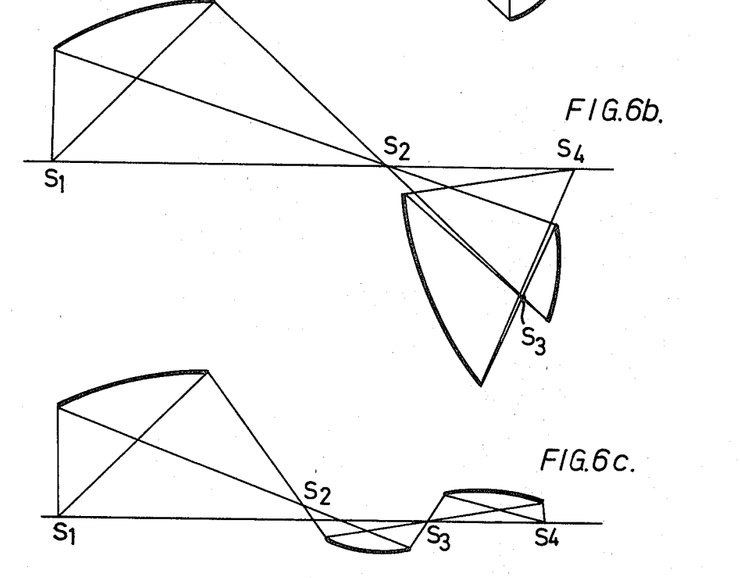
Figure 6D:
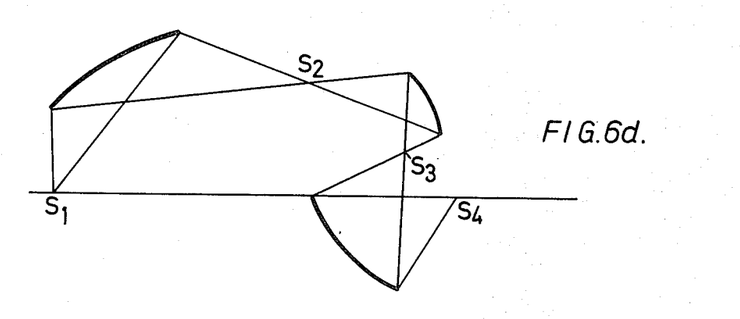

FIGS. 5a and 5b show arrangements in which each mirror is formed of two portions. In each case, the first mirror is an integral mirror, but comprises a surface of revolution generated by a line formed by two elliptical curves 51 and 52 meeting at 53. In FIG. 5a, the curves 51 and 52 have a smooth transition at 53, whereas in FIG. 5b there is an abrupt change of direction at 53.

The second reflector in FIGS. 5a and 5b comprises two separate portions. Light reflected from the portion 51 of the first mirror passes to a first portion 61 of the second mirror to be brought to a final focus at the focal plane, whereas light reflected from the second portion 52 of the first mirror is reflected at a second portion 62 of the second mirror to be brought to a focus at the same point in the focal plane. The portions 51 and 61 have a common ring focus represented at 71, whereas the portions 52 and 62 have a common ring focus represented at 72. The intermediate image at 71 is of a different magnification at the final focal plane from that at 72. The overall magnifications at the final focal plane after reflections at the portions of the second mirror are more uniform than if the first reflector had been a uniform ellipsoid.

Any convenient number of portions can be provided for a reflector. A single portion reflector of high ellipticity which might give magnifications ranging from 0.01 to 3.0 could by division into a suitable number of suitable portions be adjusted to give a more uniform magnification to the incident radiation.

It would be possible for one portion of the mirror to bring radiation to a point focus on the axis 13 while the other portion brings it to a ring focus.

In the arrangement of FIG. 5a, the pencil of rays to portion 62 of the second reflector enclose those to portion 61. In the arrangement of FIG. 5b, the pencil of rays to portion 62 enclose the pencil of rays which were radiated in the opposite direction from the source from those enclosed in FIG. 5a. Only rays emitted on one side of the axis are shown in the Figures.

In FIG. 5a, the radiation between both portions of the first reflector and the second reflector cross the optical axis 13, wherein in FIG. 5b only the radiation between the first portions 51 and 61 of the two mirrors crosses the axis 13, the radiation between the second portions 52 and 62 remaining on one side of the axis 13 in the journey between the source S1 and the final focus S3. In each case, it will be seen that the pencil of rays to the second portion 62 of the second mirror is not obscured by the first portion 61 of the second mirror, it being borne in mind that each portion is, in fact, a surface of revolution about the axis 13.

It is possible to use more than two mirrors to reflect light from the source S1 to the final focus, depending upon the requirements of the application. Consecutive mirrors in the chain will have common foci, and these foci can be points on the optical axis or rings about the optical axis. Thus, in a three-mirror system, the second mirror may have a common ring focus with the first mirror and a common ring focus with the third mirror, the mirror being generated by rotating an elliptical curve about a line which does not pass through either focus of the curve. FIGS. 6a to 6d inclusive show various arrangements of three-mirror systems, with differing numbers of crossings of the axis 13 by the rays and including doubling-back of the pencil of rays in its path to the final focus. Two or three of the mirrors in the chain can be formed in more than one portion, the corresponding portions of adjacent mirrors having common foci which will be different for the different portions.

Figure 9:
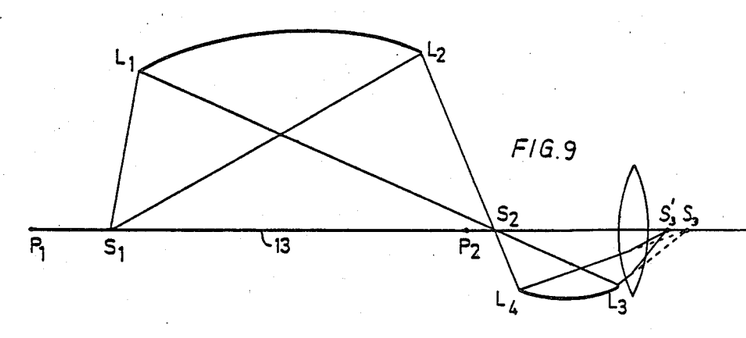

It will be seen that in all the embodiments of the invention so far described and in contrast to FIG. 1, the final focus of the system is located beyond the second reflector, that is on the side of the final reflector remote from the first reflector. This enables the sample to be placed in the focal plane without obstruction from the second reflector. A convergent lens may be provided in the space between the second reflector and the final focus in order to bring the final focal plane closer to the second reflector and decrease the magnification, as shown in FIG. 9. In FIG. 9, $S_3$ shows the location of the final focus in the absence of a lens, while $S_3'$ shows the final focus with a lens present.

Although the first reflector in FIG. 2 and other Figures only collects radiation over a limited angle, the radiation falling upon the first reflector over that angle may be increased by providing a back reflector for reflecting light originally emitted from the source in the opposite direction from the first reflector back along its path past the source and onto the first reflector. Such a back reflector can be formed by a surface of revolution generated by rotating an arc of a circle centered on the source about the axis 13 in which case the radiation is reflected back through the source. If the reflector is an ellipsoid, the radiation is refocussed separately from the source which may be convenient, since it avoids heating the bulb body to such an extent as would be the case with the arc back reflector. The extent of the back reflector should be restricted so that it does not obscure radiation emitted from the source from reaching the first reflector.

One of the reflectors, and preferably the last reflector in the system, may be arranged to produce an elongated focus. Such a reflector is generated by rotating an elliptical curve about its major axis, dividing the surface of revolution so generated into portions, e.g. by dividing along parallel planes parallel to the axis of the surface of revolution.

Figure 7A:
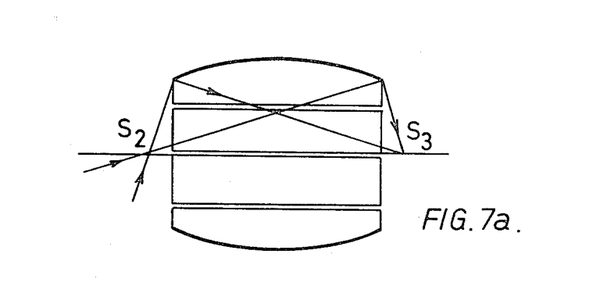

FIG. 7a shows an ellipse of revolution divided into six portions at three parallel planes, one through the axis and the others equally spaced from it. The inner portions are in pairs, only one of each pair being visible.

Figure 7B:
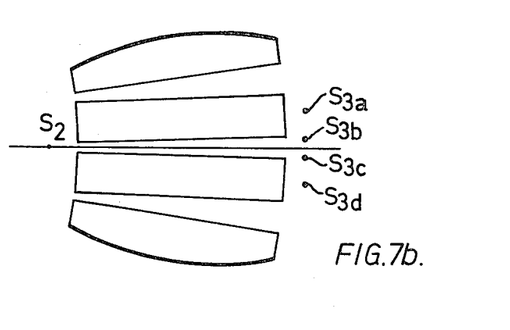

FIG. 7b shows the divided portions pivoted outwards from each other about an axis through the first focus S2, the inner portions being pivoted from their positions in FIG. 7a by smaller angles than the two outer portions. Whereas radiation from the first focus S2 would be brought to a single second focus point S3 in FIG. 7a, the pivoting of the portions in FIG. 7b brings radiation to four separate focus points S3a, S3b, S3c and S3d, arranged in an arc crossing the axis at right angles both to the optical axis and to the pivot axis. Six separate points could be achieved if the portions of the pairs were pivoted at different angles. Increasing the number of portions each with a different pivot angle increases the number of separate final focus points, so that the reflector effectively has a final focus band.

The arrangement of FIG. 7b could be modified by pivoting the portions towards each other rather than away from each other as shown in FIG. 7b. It would however be necessary to remove edge regions of the portion which would otherwise obstruct each other when so pivoted.

When the final focus of the system is arranged in a band as described with reference to FIG. 7 or in a ring as described with reference to earlier Figures, the radiation from the source can be spread over a band or circle in order to irradiate a larger area in the focal plane. If individual portions of a reflector produce a gaussian distribution of radiation, the arrangement of the final focus in a band or circle facilitates a more uniform distribution of radiation.

It is preferable, in order to keep the size of the focussing system within reasonable limits, that the first reflector means of the system should be ellipsoidal. However, the choice of the quadratic curve to generate each reflector means is finally governed by the required convergence of the emergent radiation and the magnification to be produced at the final image.

Figure 8:
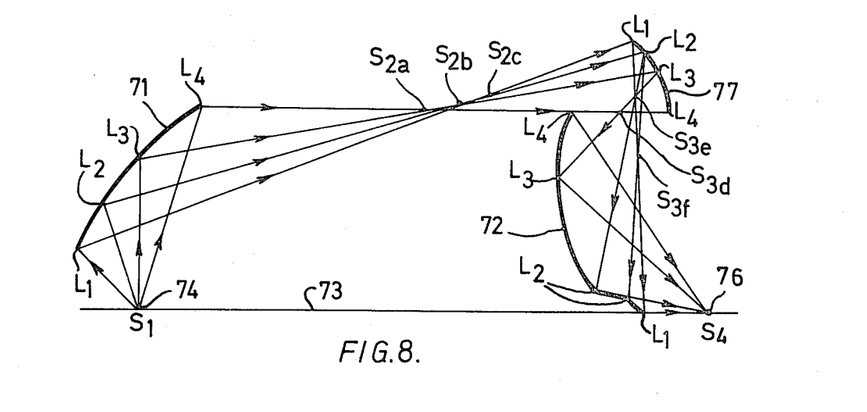

The single mirrors in any of the embodiments described above may be replaced by mirror portions associated with different ring foci. FIG. 8 illustrates such a modification of a three-reflector system in which each of the reflectors is replaced by three contiguous mirror portions. The portion L1L2 of the first mirror 71 focusses light from the source at a common focus point 74 to a first ring focus S2C, the second portion L2L3 focusses radiation from the source at 74 to a second ring focus S2B and the third portion L3L4 focusses radiation from the source 74 to a third ring focus S2A.

Corresponding contiguous portions of the further mirror 77 focus radiation from the three ring foci to three further ring foci S3F, S3E and S3D, and the three portions of the final mirror 72 project radiation from these ring foci to a common image point 76 located beyond the mirrors and on the axis 73. Although most of the mirror portions are shown contiguous, the first and second portions of the final mirror 72 are not contiguous.

In the embodiments of FIG. 8, the relative positions of the ring foci are chosen to keep the magnification of the final image to a smaller range, thereby making its illumination more uniform.

What I claim is:

1. A reflective focussing system for projecting an image of an object located at an object position on the axis of symmetry of the system to an image position along said axis, said system being characterized by two confocal concave reflector means, generated by rotating a quadratic conic section about said axis, of which the first reflector means is arranged with a first focus at said object position such that it receives radiation from the object travelling at angles between 30 degrees and 150 degrees to said axis, and the second reflector means is arranged with a first focus centred on said axis, the second foci of said reflector means being at least substantially common, the first focus of the second reflector means being located on the side of the second reflector means remote from the first reflector means.

2. A reflective focussing system for projecting an image of an object located at an object position on the axis of symmetry of the system to an image position along said axis, said system being characterised by two confocal concave reflector means, generated by rotating a quadratic conic section about said axis, of which the first reflector means is arranged with a first focus at said object position such that it receives radiation from the object travelling at angles between 30 degrees and 150 degrees to said axis, and the second reflector means is arranged with a first focus centred on said axis, further means being provided to project radiation focussed at the second focus of the first reflector means to a focus at the second focus of the second reflector means, the first focus of the second reflector means being located on the side of the second reflector means remote from the first reflector means.

3. A system as claimed in claim 2 characterised in that said further means comprises reflector means confocal with said two reflector means.

4. A system as claimed in claim 1 or 2 characterised in that at least one said reflector means is generated by rotating an ellipse about said axis.

5. A system as claimed in claim 1 or 2 characterised in that a said reflector means is generated by rotating a quadratic conic section about an axis inclined to the line joining the foci of the section.

6. A system as claimed in claim 5 characterised in that said axis and said line intersect at one of said foci.

7. A system as claimed in claim 1 or 2 characterised in that said second reflector means is a surface of revolution divided into portions along planes parallel to each other and to the axis, the portions being subsequently displaced by pivoting about a pivot axis through the said first focus transverse to the axis of revolution.

8. A system as claimed in claim 1 or 2 characterised in that an adjacent pair of said reflector means is formed in a plurality of portions, the corresponding portions of the adjacent pair having a common second focus different from the second foci of the other portions.

9. A system as claimed in claim 8 characterised in that adjacent portions of a reflector are contiguous.

10. A system as claimed in claim 1 or 2 characterised by a convergent lens located between said second reflector means and its first focus.

11. A system as claimed in claim 1 or 2 characterised in that the reflector means are constructed and arranged so that radiation projected from the first reflector means to the second reflector means crosses said axis.

12. A system as claimed in claim 1 or 2 characterized in that said first reflector means receives radiation from the object travelling at angles between 65 and 115 degrees to said axis.

13. A system as claimed in claim 1 or 2 characterized in that said first reflector means receives radiation from the object travelling at angles between 100 and 140 degrees to said axis.

* * * * *